US011416247B1

United States Patent
Bastide et al.

(10) Patent No.: US 11,416,247 B1
(45) Date of Patent: Aug. 16, 2022

(54) HEALTHCARE APPLICATION DATA MANAGEMENT BASED ON WASTE PRIORITY

(71) Applicant: INTERNATIONAL BUSINESS MACHINES CORPORATION, Armonk, NY (US)

(72) Inventors: Paul R. Bastide, Ashland, MA (US); Shakil Manzoor Khan, Highland Mills, NY (US); Senthil Bakthavachalam, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 17/248,805

(22) Filed: Feb. 9, 2021

(51) Int. Cl.
*G06F 9/44* (2018.01)
*G06F 8/77* (2018.01)
*G06F 8/71* (2018.01)
*G06F 16/2455* (2019.01)
*G06F 8/41* (2018.01)
*G06F 8/76* (2018.01)

(52) U.S. Cl.
CPC ............... *G06F 8/77* (2013.01); *G06F 8/433* (2013.01); *G06F 8/71* (2013.01); *G06F 8/76* (2013.01); *G06F 16/24568* (2019.01)

(58) Field of Classification Search
None
See application file for complete search history.

(56) References Cited

U.S. PATENT DOCUMENTS

| | | | | |
|---|---|---|---|---|
| 7,685,005 | B2* | 3/2010 | Riff | G06Q 40/08 705/2 |
| 9,576,036 | B2* | 2/2017 | Li | G06F 16/254 |
| 9,985,992 | B1* | 5/2018 | Luce, Jr. | H04L 63/10 |
| 10,135,705 | B2* | 11/2018 | Asenjo | H04L 41/5074 |
| 10,198,460 | B2 | 2/2019 | Gorelik | |
| 10,346,358 | B2* | 7/2019 | Gorelik | G06F 16/217 |
| 2008/0195430 | A1* | 8/2008 | Rustagi | G06Q 10/06395 705/7.41 |
| 2011/0047525 | A1 | 2/2011 | Castellanos | |
| 2013/0006931 | A1 | 1/2013 | Nelke | |
| 2017/0371703 | A1* | 12/2017 | Wagner | G06F 9/485 |
| 2018/0341865 | A1* | 11/2018 | Lu | G06F 8/61 |
| 2021/0142907 | A1* | 5/2021 | Mowery | G06N 3/0454 |
| 2021/0313051 | A1* | 10/2021 | Asselmann | G16H 40/40 |

(Continued)

OTHER PUBLICATIONS

Aung, et al., "Application of multi-criteria-decision approach for the analysis of medical waste management systems in Myanmar," Journal of Cleaner Production, 2019, 14 Pages, vol. 222, Retrieved from the Internet: <URL: https://www.sciencedirect.com/science/article/abs/pii/S0959652619307383?via%3Dihub>.

(Continued)

*Primary Examiner* — Qamrun Nahar
(74) *Attorney, Agent, or Firm* — Steven M. Bouknight

(57) ABSTRACT

Software application data management. A data stream generated via a software application is received. A user profile is determined for a developer of the software application. One or more complications in a data model of the software application are predicted. Data of the data stream received is managed based on the one or more complications in the data model.

20 Claims, 6 Drawing Sheets

(56) References Cited

U.S. PATENT DOCUMENTS

2021/0313052 A1* 10/2021 Makrinich ............ G06N 3/0454
2021/0398666 A1* 12/2021 Maslik ................... G16H 15/00

OTHER PUBLICATIONS

Disclosed Anonymously, "Holistic, Policy-Driven, Access Control for Smarter Healthcare," IP.com, Feb. 22, 2011, 6 pages, IP.com No. IPCOM000204388D.

Disclosed Anonymously, "Security feature for paper-based diagnostic device," IP.com, Oct. 6, 2014, 5 pages, IP.com No. IPCOM000239052D.

Editorial Team, "The Hidden Costs of Bad Data," insideBIGDATA. com, May 5, 2017 [accessed on Jan. 13, 2021], 3 pages, Retrieved from the Internet: <URL: https://insidebigdata.eom/2017/05/05/hidden-costs-bad-data/>.

Feldman, et al., "Big Data in Healthcare Hype and Hope," Dr. Bonnie 360°, Oct. 2012, 56 pages.

HAPI FHIR, "FHIR and HAPI FHIR Versions," hapi-fhir.com, Datasheet [online], [accessed on Feb. 3, 2021], 1 pages, Retrieved from the Internet: <URL: https://hapifhir.io/hapi-fhir/docs/introduction/versions.html>.

IBM Big Data & Analytics Hub, "The Four V's of Big Data", Infographics [online], [accessed on Feb. 2, 2021], 1 page, Retrieved from the Internet: <URL: https://www.ibmbigdatahub.com/infographic/four-vs-big-data>.

IBM, "A Methodology for Managing Exceptions in Healthcare Information Systems," IP.com, Nov. 6, 2008, 22 pages, IP.com No. IPCOM000176164D.

Mell, et al., "The NIST Definition of Cloud Computing", National Institute of Standards and Technology, Special Publication 800-145, Sep. 2011, 7 pages.

Redman, "Bad Data Costs the U.S. $3 Trillion Per Year," Harvard Business Review, Sep. 22, 2016, 5 pages, Retrieved from the Internet: <URL: https://hbr.org/2016/09/bad-data-costs-the-u-s-3-trillion-per-year>.

Siemens, et al., "Data Stream Module in Clinical Workflow Simulation Tool for Healthcare Institutions," IP.com, Jun. 25, 2008, 6 pages, IP.com No. IPCOM000171450D, Siemens AG 2008.

* cited by examiner

HEALTHCARE APPLICATION DATA MANAGEMENT BASED ON WASTE PRIORITY

BACKGROUND

The present invention relates generally to data management and processing in a distributed computing environment, and more particularly to dynamically moderating healthcare application data, and to dynamically moderating healthcare application insight compilation velocity.

Healthcare systems generally refer to computing systems or computing environments adapted for use in the healthcare industry, for healthcare-related purposes, or to perform healthcare-related tasks. For example, a healthcare system may be configured to store and process electronic health records (EHR) of patients, and to execute workflows that use EHRs. In one implementation, the healthcare system may be a distributed computing system, which also may be referred to as a platform or a cloud platform. These terms will be used interchangeably as needed based on the specific context of embodiments of the claimed invention.

SUMMARY

Embodiments of the present invention provide methods, systems, and computer program products for software application data management. The embodiments receive a data stream generated via a software application and determine a user profile for a developer of the software application. The embodiments predict one or more complications in a data model of the software application and manage data of the data stream received based on the one or more complications in the data model.

BRIEF DESCRIPTION OF THE DRAWINGS

The novel features believed to be characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 4:
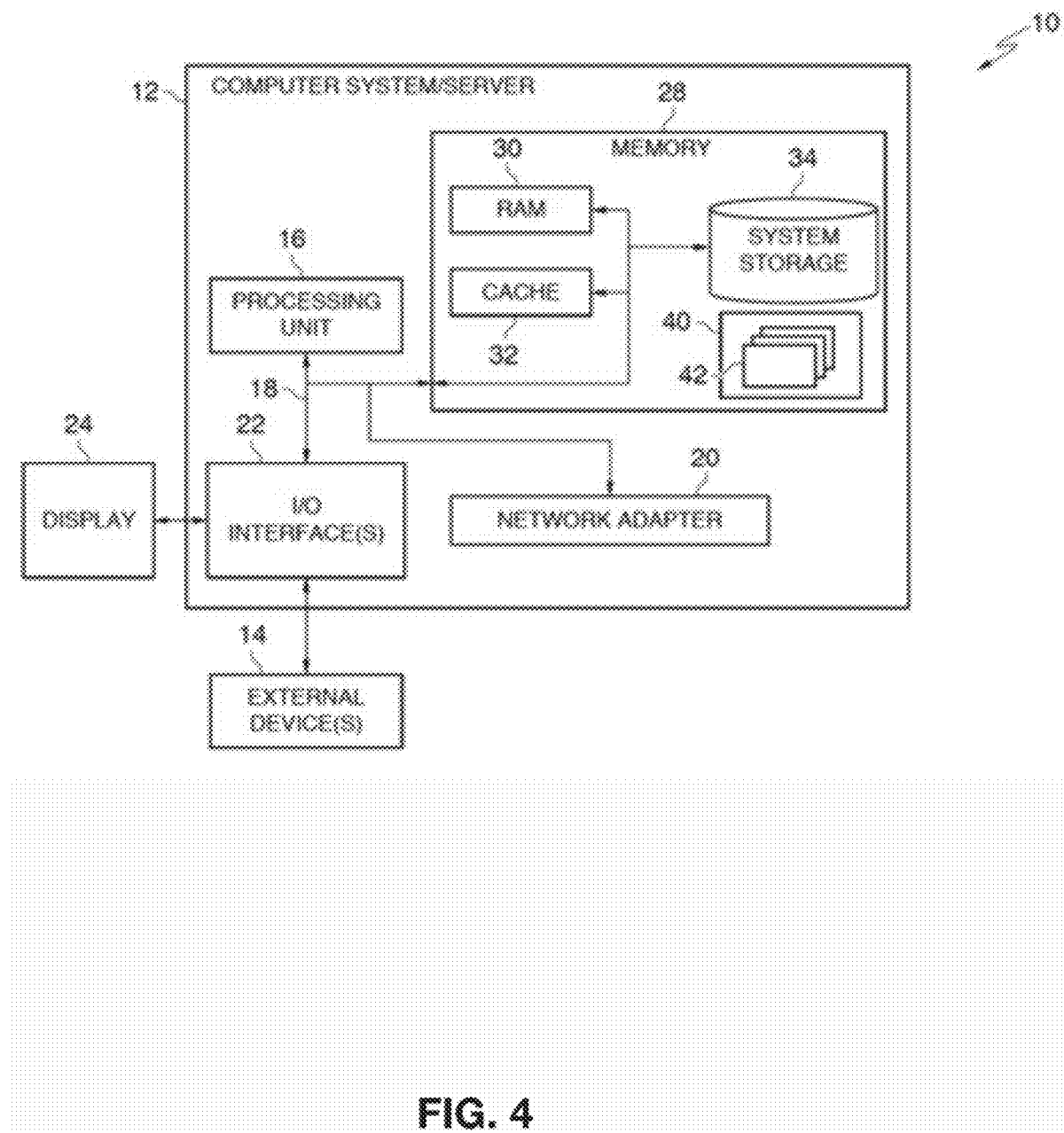
FIG. 4 is a functional block diagram 10 of a computing device or cloud computing node, according to an embodiment of the invention.
Figure 5:
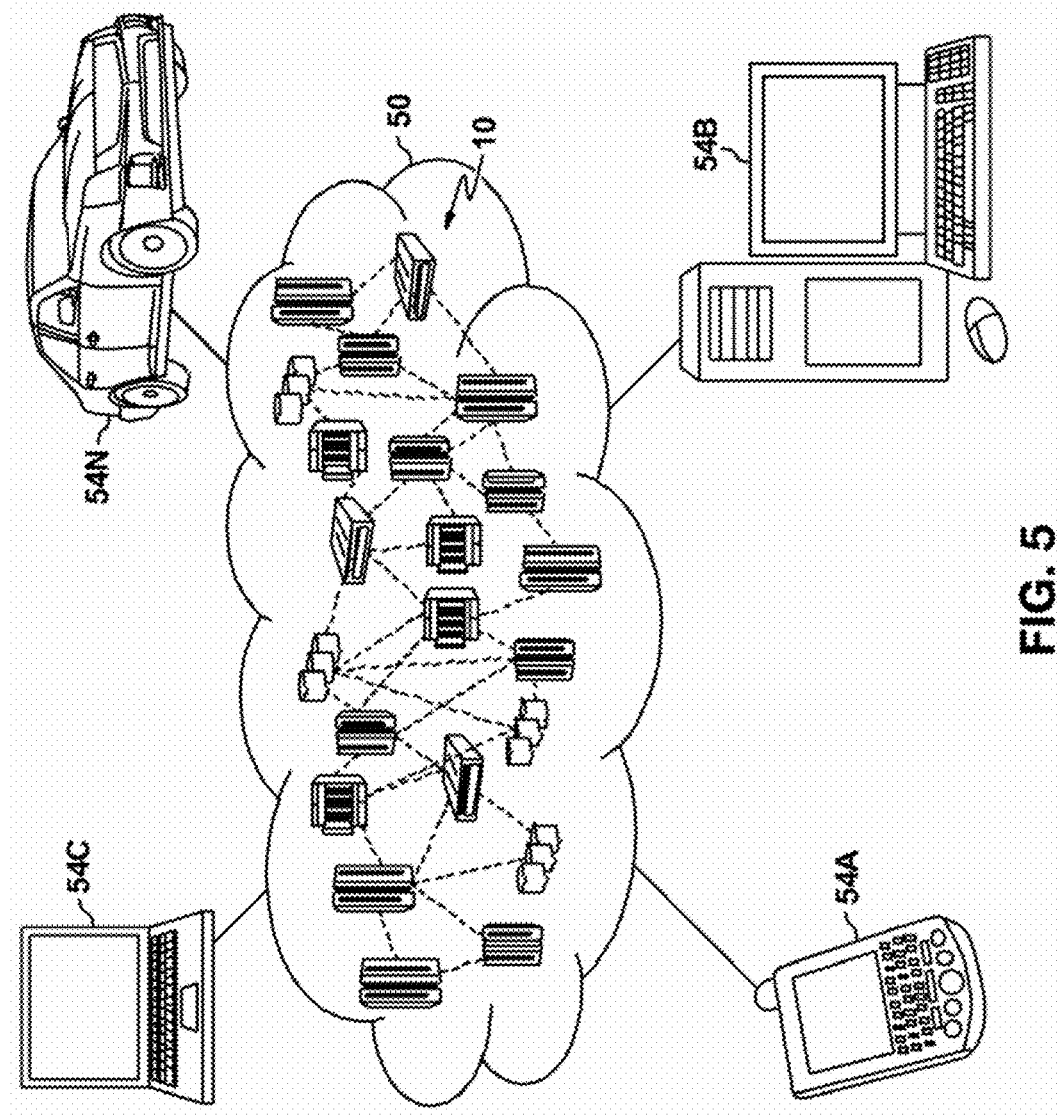
FIG. 5 is a functional block diagram 50 of a collection of computing devices or cloud computing nodes, such as the one depicted in FIG. 4, according to an embodiment of the invention.
Figure 6:
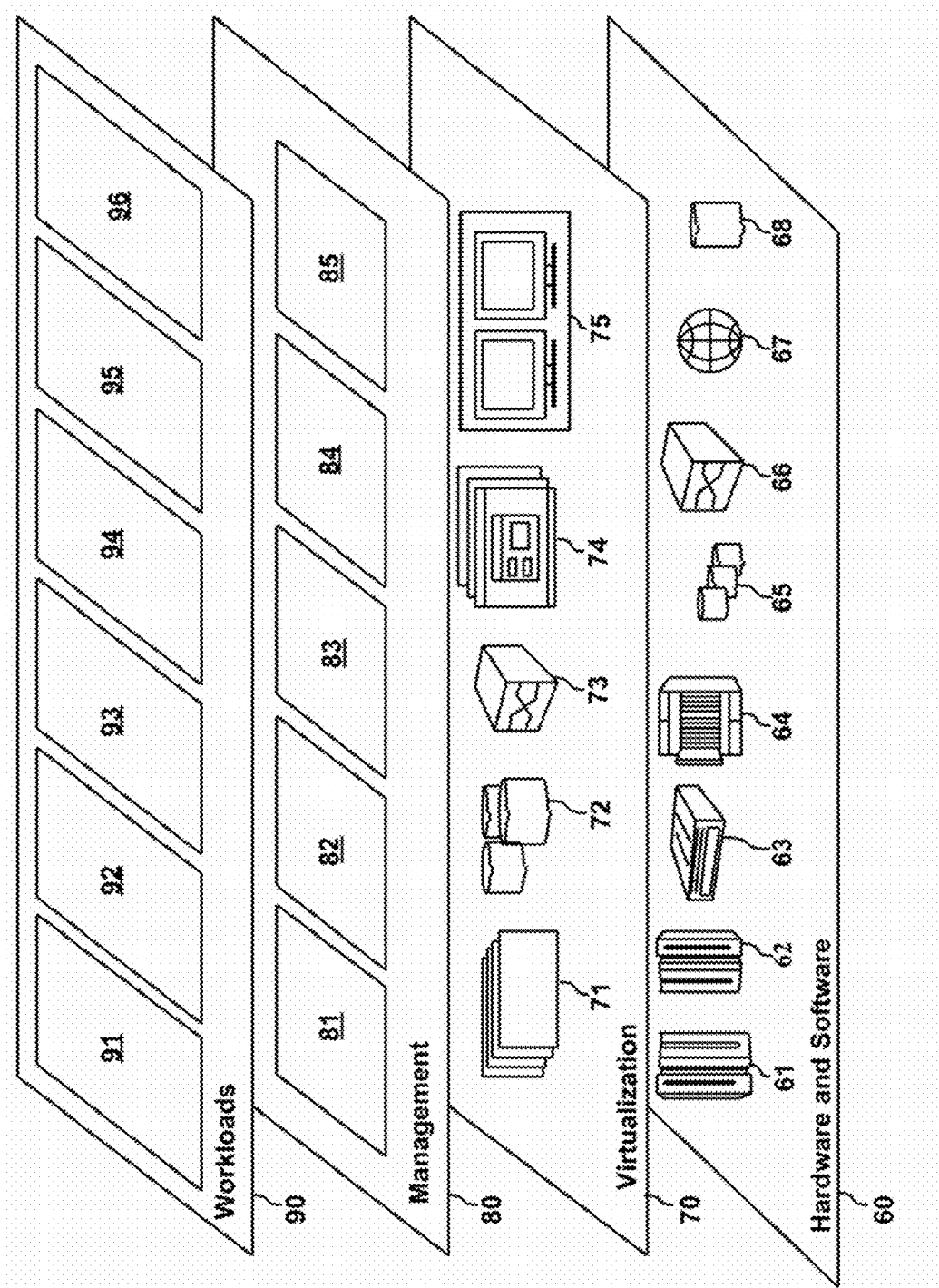
FIG. 6 is a functional block diagram of functional layers of the cloud computing environment of FIG. 5, according to an embodiment of the invention.

As described above in connection with the Background of embodiments of the invention, a healthcare system may be configured as a cloud computing platform for healthcare. An exemplary embodiment of the configuration and functional operation of such a cloud computing platform is depicted in FIGS. 4, 5, and 6.

According to an embodiment of the invention, the cloud computing platform for healthcare is a multi-tenant healthcare platform that stores and processes Electronic Health Records (EHRs), Protected Healthcare Information (PHI), and Medical Event data (collectively, "healthcare data"). The cloud computing platform for healthcare may be accessible by, and the healthcare data may belong to, multiple users, including healthcare provides, facilities, vendors, customers, patients, and other organizations and individuals. In one embodiment, data is added to the cloud computing platform for healthcare using an Extraction-Transformation-Load (ETL) pipeline. Using this pipeline, data is loaded into a data lake, data reservoir, and data mart. As a new data element arrives for loading, a pipeline executes stages that collectively perform an ETL operation to load the data into the cloud computing platform for healthcare. The new data element may be, for example, a "Health Level 7" (HL7) message, an "Admission Discharge, Transfer" (ADT) message, or a "Fast Healthcare Interoperability Resource" (FHIR) bundle.

Embodiments of the invention may be used for more than one application or tenant. As such, a tenant configuration may include: a set of insight queries for specific adherence and administration calculations and a set of specific dimensional models and data schemas. Embodiments of the invention may be used for more than one application and multiple tenants. Embodiments of the invention may be referential, normalized or de-normalized. Embodiments of the invention may apply to fixed or server-less infrastructure. Embodiments of the invention apply to any time of data processing—Near-Realtime (NRT), Batch, or Bulk.

Cloud computing platform for healthcare may receive large amounts of data—big data—to process. Much of this data may be of poor quality and unsuited for informed decisions and functions. Processing high volumes of poor-quality data impacts the "four V's" of big data: volume (scale of data), variety (different forms of data), velocity (analysis of streaming data), and veracity (uncertainty of data) which contribute to the cost of big data analytics.

Developers typically address these challenges by creating complicated rules that sort and pre-process received data, such that primary and resource-intensive functions are performed only on processed high-quality data. However, bad data still wastes time because of the need for pre-processing, and because not all data is filtered out. Data models generated based on bad data are untrustworthy and cause users to hesitate when making critical decisions; users want it all to just work.

In the context of the cloud computing platform for healthcare described above, when it receives bad data, each piece of bad data impacts shared costs and resources. For instance, the data is added to the system using an ETL (Extraction-Transformation-Load) pipeline to load the data into a data lake, data reservoir and data mart. As a new data element (HL7 message, ADT message, FHIR Resource bundle) arrives, a pipeline executes stages to extract-transform-load (ETL) each data into the system. The pipeline, for a bad application, costs extra time to process.

For example, consider the following illustrative scenario, referred to as Scenario 1. Fred creates an application—XYZ. Fred is a terrible programmer. Fred's application creates ten times more data than it should. The data is uploaded to the cloud computing platform for healthcare and is used to build a data model. An analyst tries to figure out the model and make sense of the incoming data. The model is taking longer to develop than expected. The analyst is frustrated with Fred's application. Table 1 shows an example structure of Fred's application code:

TABLE 1

Bad Data Model Example - Overly Nested

```
{
  "contained": [
    {
      "code": [
        "text": "Obesity"
      },
      "id": "myCarePlan",
      "resourceType": "Condition",
      "verificationStatus": "confirmed",
    "extension": [
      {
      "url": "Defaulturl",
        "valueString": "DefaultvalueString"
      }]
    }
  ]
}
```

There must be a better way to prioritize work/data when the application is poorly formed.

Embodiments of the invention may address these and other challenges. An embodiment of the invention manages the costs of bad data, by: profiling the author of the tool generating the data and the user generating the data, calculating for the author profile the familiarity with the data standard and strategy (e.g. FHIR DSTU2), predicting the complicated interdependent conditions, and managing the data related to the author's developed application.

The profiling may be done through use software development and version control platform functions, such as check-ins, commits and corresponding searchable documents. The strategy can be analyzed for currency and adoption. The conditions can include size of payload, transparency of the data model, traffic shape, inspection of traffic, entropy, and information gain.

One or more advantages of some embodiments of the invention include minimization of effects of bad data, improvement of decision-making using data models generated based on big data, codifying data strategies related to the code that produces the data, and enhancing the experience with ETL and Datapipelines and Refineries as a Service (Cloud); among others.

Additional details of some embodiments of the invention are described in connection with the following illustrative scenario, Scenario 2. Fred is working for Company M. Company M has an enterprise git. Fred creates XYZ application and checks the application into his project repository. Fred has checked a pom.xml project with dependencies. The project depends on HAPI FHIR API v1.4, and there is no other dependency. The project contains five classes to model the data using the HAPI API:

ResourceGenerator
Contained
Code
Extension
ResourceForwarder

The project does not contain any test cases or data in src/test/java. The project is pushed into production and begins forwarding resources to the Data Processing system.

The data processing system receives an application specific data element (identified by App-ID):

```
{
  "contained": [
    {
      "code": {
        "text": "Obesity"
      },
      "id": "myCarePlan",
      "resourceType": "Condition",
      "verificationStatus": "confirmed",
    "extension":
      {
      "url": "Defaulturl",
        "valueString": "DefaultvalueString"
      }]
    }
  ]
}
```

In the above Scenario 2, an embodiment of the invention queries the git repository based on the app-id label and profiles the code from Fred (This example only shows a single developer. For multiple developers, an aggregated profile with weights related to responsibility may be developed; e.g. Barney has 10% of check-in's weight his content 10% of the aggregate).

Tests: No
Dependencies: Yes
Dependencies with Standards associated: Yes
HAPI FHIR API→FHIR:IS_NOT_CURRENT standard The embodiment iterates over Fred's check-ins on all projects and assigns 'git blame' to each check-in from Fred and associate currency with the standard and current dependencies.

The embodiment scans the data model in git for complicated dependencies.

Hierarchical Depth >2: Yes
Inter Resource Reference: No

The embodiment activates the management function for Fred's data.

The embodiment notifies the operators that Fred's data should be put in a separate processing queue due to complexities and familiarities with the standards. The queue may be removed from parallel processing.

The embodiment alerts Fred to the needed updates with dependencies and forced flattening to improve processing.

The data is flattened into a columnar structure and stored in a denormalized data lake.

The above-described functions illustrated in Scenario 2 may be enabled and performed, as follows, according to an embodiment of the invention.

In an embodiment, the above functions may be integrated with a software development and version control platform (such as Git) and a data processing system. The data processing system loads data into a data lake, and then processes the data via a custom set of ETLs to load into an analytical warehouse. The ETL is based on DataStage® (trademarks are properties of their respective owners).

Profiling the author/developer of the application may be performed as follows: For the given application (in an app-id header), the embodiment maps to a project's code repository.

The embodiment may operate as a service account in an enterprise version of the software development and version control platform. The embodiment profiles the application for contributors to the most current and related commits. The embodiment performs profiling through check-ins, commits and corresponding searchable documents.

The embodiment establishes: Blame—who is responsible for commits; Dependencies—total hierarchy for dependencies. Data Model complexity; Related Standards; and Establish an inter-dependent map.

The standard use is analyzed for currency and adoption. The conditions include size of payload, transparency of the data model, traffic shape, inspection of traffic, entropy and information gain. The embodiment maintains a dependency (jar) to standard mapping, such as a source URL.

The embodiment establishes a profile based on each person in the git and aggregates into a set. The embodiment uses the aggregate set of calculating for the author profile the familiarity with the data standard and strategy (e.g. FHIR DSTU2). From the aggregated set of check-ins and dependency to standard mappings, the embodiment determines familiarity.

The embodiment may also record incoming data standard use using XML header or JSON specific fingerprint matching with specific standards and associating with specific developers.

In the disclosed embodiment, the function of predicting the complications likely in the application data model is performed as follows: based on the complexity of the data model, and the application interdependencies, loops, fan-ins, and fan-outs, the embodiment determines likely interdependent conditions in the application data model.

In the disclosed embodiment, the function of managing the data related to the author/developer's application may be performed as follows. The embodiment manages the data related to the author's application by: lowering costs for conforming applications (or raises for non-conforming); pushing the data to an independent processing queue; moving the processing to on-demand from downstream queries; alerting developers and operators to the state/risk of the application; offloading the processing to low-quality hardware or putting on more cores and memory; suggesting changes to developers to improve processing; alerting to currency and spread of data; and alerting to co-dependencies and inter-relationships which must be refactored.

Some embodiments of the invention will now be described in more detail in connection with the Figures.

Figure 1:
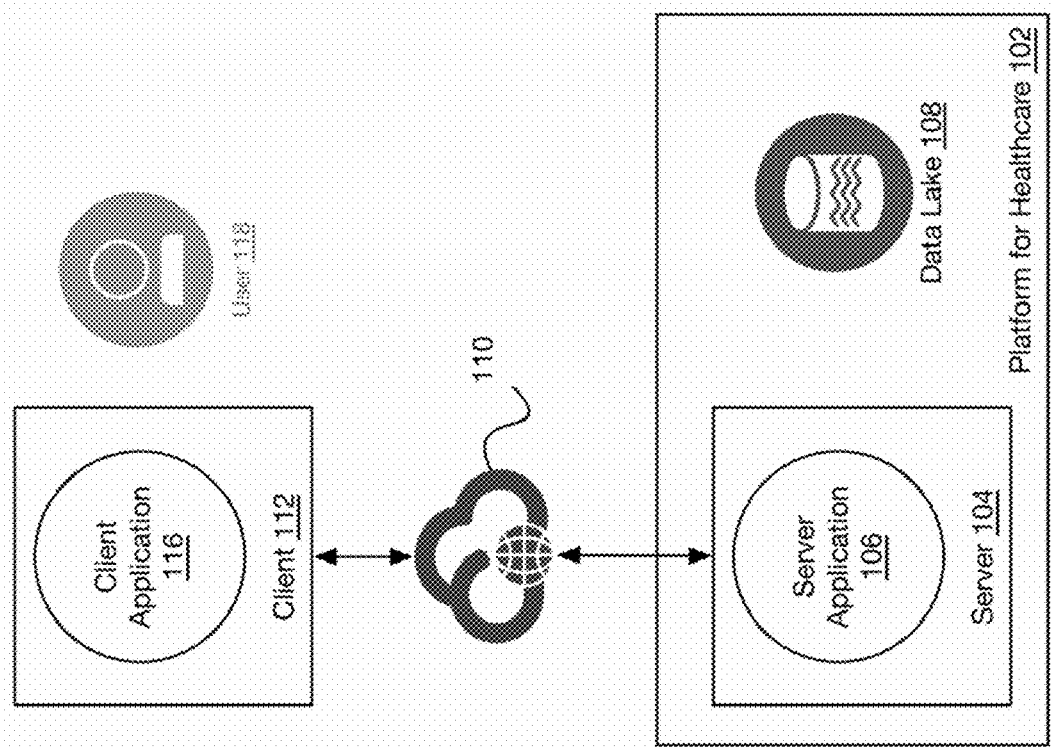
FIG. 1 is a functional block diagram of an illustrative distributed computing environment 100, according to an embodiment of the invention.

FIG. 1 is a functional block diagram of an illustrative distributed computing environment 100, according to an embodiment of the invention.

Referring now to FIG. 1, distributed computing environment 100 includes cloud computing platform for healthcare 102 ("platform for healthcare 102"). Platform for healthcare 102 includes one or more operatively connected computing devices as described in connection with FIGS. 5-7 that collectively provide computing services and perform computing functions in healthcare use cases. These computing devices of platform for healthcare 102 include a server 104 and a data lake 108.

Server 104 includes a computing device having one or more processors and one or more tangible storage media for storing programming instructions of one or more computer applications, including a server application 106. Server application 106 receives input data, process the input data, and generates output data, to enable one or more functions of platform for healthcare 102. Server 104 is operatively connected to a network 110 through which it connects to one or more other devices outside of platform for healthcare 102.

Data lake 108, in its most general sense, refers to a data repository. In the context of platform for healthcare 102, it refers to a single point of storage for at least some collections of data that platform for healthcare 102 processes and manages. For example, in one implementation, all patient raw data (such as EHRs) may be stored in data lake 108. The stored data may be in its natural or raw format. Data lake 108 can include structured data from relational databases (rows and columns), semi-structured data (CSV, logs, XML, JSON), unstructured data (emails, documents, PDFs) and binary data (images, audio, video). Other groupings of data are also possible (such as a data reservoir, and data mart). Such groupings of data can be configured in various embodiments of the invention to facilitate the objectives of the particular implementation of distributed computing environment 100, and may be based on the nature and size of the data to be managed and processed, or by the number or type of users and other actors interacting with distributed computing environment 100.

In the embodiment depicted in FIG. 1, a Data Lake 108 stores healthcare data for management and processing. Data Lake 108 may have one or more databases, such as one or more shared physical HBase tables; HBase is an open-source non-relational distributed database. The Shared physical HBase may include an HBase Table constituting an "FHIR Data Lake" (storing FHIR data) and an HBase Table constituting a "Raw Data Lake" (storing raw data).

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between two computing devices.

Client 112 device can be a laptop computer, tablet computer, netbook computer, personal computer (PC), a desktop computer, a personal digital assistant (PDA), a smart phone, a smart watch, or any programmable electronic device capable of communicating with server 104 via network 110. Client 112 device includes client application 116, having a set of programming instructions that can execute locally or remotely.

One or more users 118 can operate or interact with the various devices of distributed computing environment 100.

Figure 2:
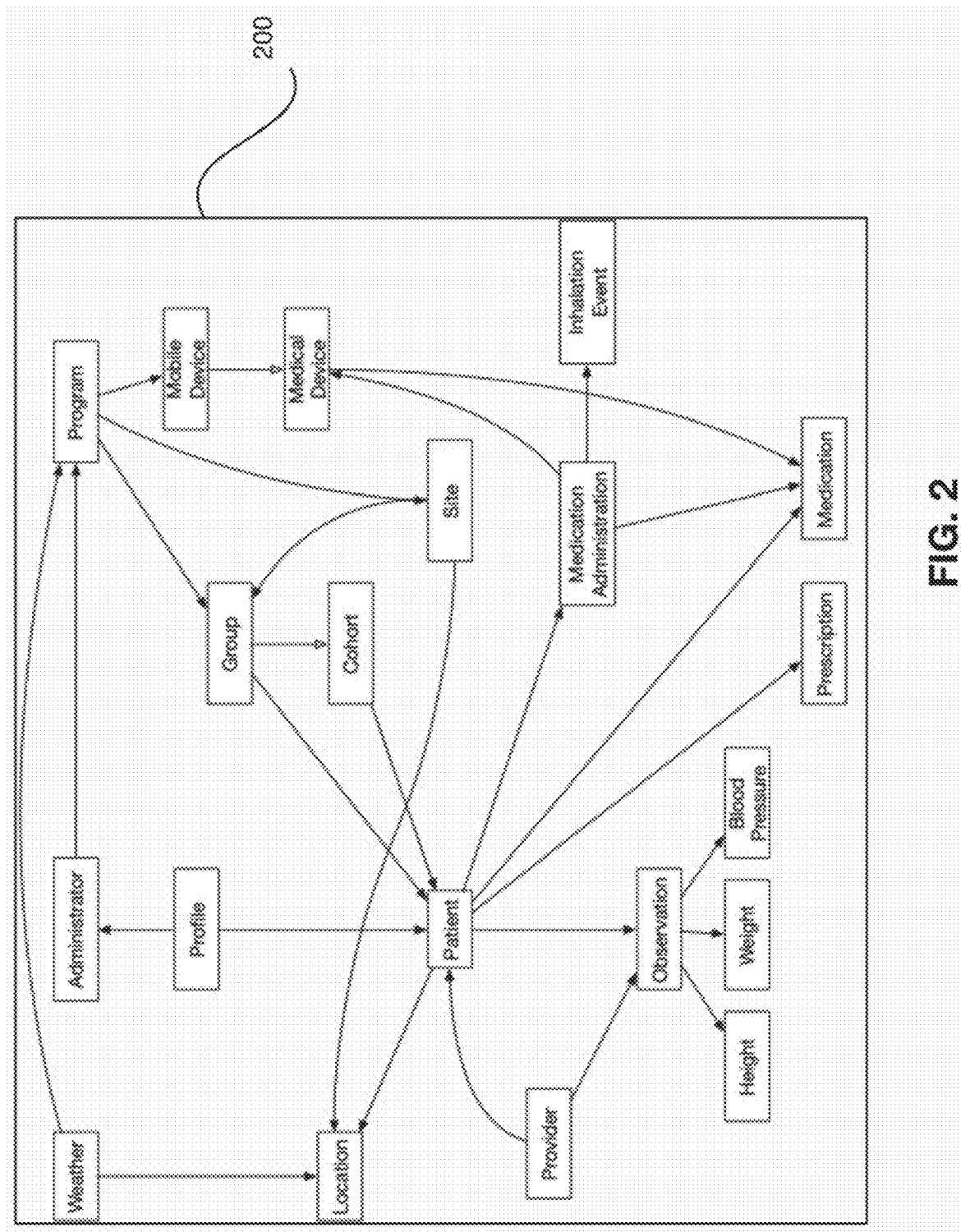
FIG. 2 is a block diagram of an entity relationship model 200 used in distributed computing environment 100 of FIG. 1, according to an embodiment of the invention.

FIG. 2 is a block diagram of an entity relationship model 200 ("model 200") used in distributed computing environment 100 of FIG. 1, according to an embodiment of the invention.

Referring now to FIGS. 1 and 2, consider the following illustrative scenario: User 118 suffers from or is at risk of developing diabetes. User 118 is prescribed a diabetes protocol by his physician to treat or prevent diabetes. User 118 installs client application 116 on client device 112 to aid her in the process. In this scenario, client application 116 is a healthcare application, and client device 112 is a smartphone. The smartphone continuously monitors the user's glucose levels (for example, via readings by a glucose reader). The healthcare application on the smartphone syncs its data, including updated glucose monitoring data, with server application 106 via network 110. The synced information may exclude FHIR data and demographic data to preserve patient privacy as a matter of preference or to comply with applicable data privacy policies or laws. In this scenario, server application 106 drivers push the synced data into data lake 108 using an FHIR resource bundle. Platform for healthcare 102 processes the FHIR resource bundle (including, for example, patient data, observation data, patient ID, and other information).

The manner in which platform for healthcare 102 performs this data processing can impact its performance. If the processing is infrequent, then data analysis functions performed or enabled by platform for healthcare 102 may be unreliable or outdated; because they will have been performed without processing certain data relevant to the outcomes of those functions. On the other hand, if the processing is too frequent, the entire system may be bogged down; it cannot provide useful functions because it is always busy updating information based on continuous data updates.

It is therefore desirable for platform for healthcare 102 to process the FHIR resource bundle (or other data) to achieve one or more processing objectives, as described in connection with embodiments of the invention.

With continued reference to FIGS. 1 and 2, and to the illustrative scenario described above, model 200 includes a set of entities and their relationships. The entities and their relationships (denoted by connections) generally provide information that identifies a patient, patient demographics, medical history, observational data, device data, insurance data, events data, and other information. The information generally allows a healthcare application (such as client application 116), or a healthcare system (such as platform for healthcare 102) to provide healthcare-related computing functions.

In the case of the illustrative scenario, the data in model 200 can include patient data (e.g., identification information) and observation data, such as continuous glucose monitoring (CGM) data collected or tracked via client 112 device and client application 116. More specifically, in the depicted embodiment, the data in model 200 comprises a patient having a profile accessible by an administrator that provides or operates a computer program. The computer program is installable on a mobile device of the patient and communicates (e.g., wirelessly via Bluetooth® or WiFi) with one or more medical devices (e.g., blood glucose reader). The medical device may monitor medications and medication administration by the patient. Medication administration may be associated with an inhalation event. The program may monitor a group of patients to which the patient belongs, and may determine or monitor a set of cohorts. The group may be associated with a site (e.g., a hospital or other medical practice) or an area in which the patient resides; the site(s) may have an associated location and weather information that the program tracks. The patient also may have an associated provider, such as a medical provider. The patient may receive, via visits to the provider, observation data, such as height, weight, and blood pressure. The patient may receive prescriptions for medications, for example as a result of visits to the medical provider.

Model 200 may be stored in a datastore (for example, in data lake 108). One instance of the data may include, for example, the following data:

Observation[CGM] Cardinality: Patient→Observation=1000

Data Size=1M entries per Patient

Figure 3:
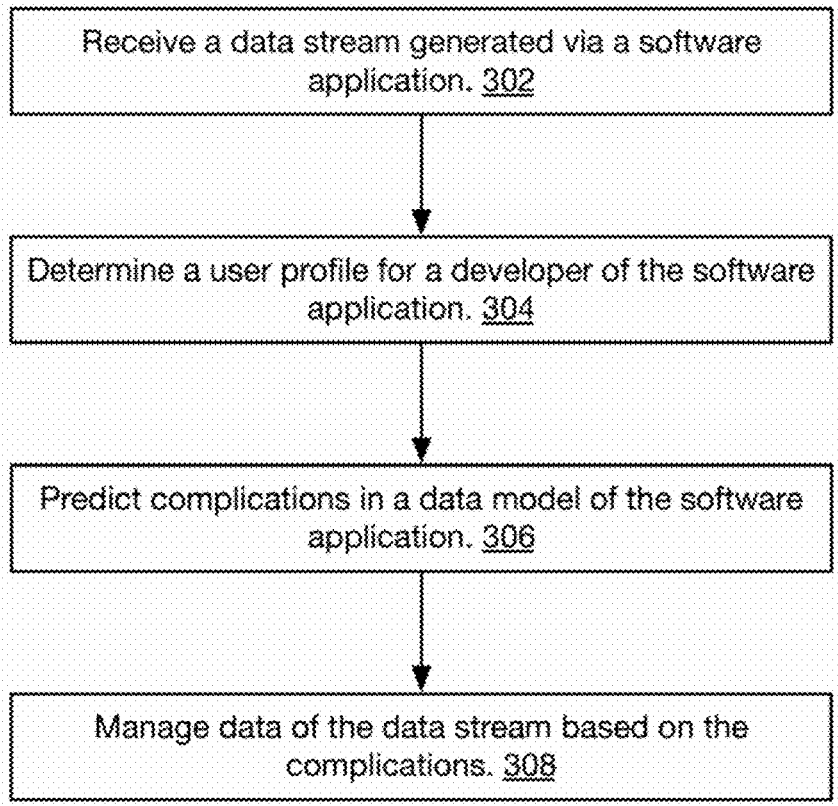
FIG. 3 is a flowchart of a method 300 for software application data management, according to an embodiment of the invention.

FIG. 3 is a flowchart of a method 300 for software application data management, according to an embodiment of the invention. Steps of method 300 are performed by executing one or more programming instructions by one or more processors of one more computer systems. The programming instructions may be stored on one or more computer program products including tangible storage media. For example, steps of method 300 may be performed by server application 106 of platform for healthcare 102, by client application 116 of client 112 device, or by a combination thereof, as shown in FIG. 1. For simplicity, functions of method 300 will be described below as performable by sever application 106.

Referring now to FIGS. 1 and 3, server application 106 receives (step 302) a data stream generated via a software application. Server application 106 determines (step 304) a user profile for a developer of the software application. Server application 106 predicts (step 306) one or more complications in a data model of the software application. Server application 106 manages (step 308) data of the data stream received based on the one or more complications in the data model.

With continued reference to FIGS. 1 and 3, server application 106 performs one or more of the following additional functions (not shown in FIG. 3) according to embodiments of the invention.

In an embodiment, server application 106 determines a user profile by creating a new user profile or updating an existing user profile for a user.

In an embodiment, server application 106 performs the receiving, determining, predicting, and managing via components of a computer software platform. The computer software platform is a standalone platform or integrated into a software development and version control platform.

In an embodiment, server application 106 determines the user profile by identifying a code repository of the software application, connecting to the code repository as an enterprise service account, identifying the developer of the software application based on a most current code commit function, and populating the profile based on a check-in function or a commit function performed by the developer.

In an embodiment, server application 106 the user profile includes data for one or more profile categories: a blame category, a dependency category, a data model complexity category, a related standards category, and an inter-dependent map category.

In an embodiment, server application 106 determines a user profile by determining currency (how current the software is) and adoption metrics for the software application.

In an embodiment, server application 106 predicts one or more complications in a data model of the software application by identifying interdependent conditions in the data model of the software application based on one or more software application interdependencies, loops, fan-ins, fan-outs, or a combination thereof.

In an embodiment, server application 106 manages data of the data stream received based on the one or more complications in the data model, by: lowering a cost metric for the software application based on a measure of conformance or increasing the cost metric based on a measure of non-conformance; pushing all or part of the data stream to a separate processing queue; moving processing of the data stream to on-demand from one or more downstream queries; alerting one or more users about results of the predicting; offloading processing to low-quality hardware or utilizing one or more additional processor cores and memory; recommending changes to the developer to improve processing; alerting a user to currency and spread of data; alerting a user to co-dependencies and inter-relationships requiring refractoring; or a combination of two or more of the above.

FIG. 4 is a block diagram of an illustrative cloud computing node, according to an embodiment of the invention. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove (for example, in connection with FIGS. 1-3, above).

In cloud computing node 10 there is a computer system/ server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

FIG. 5 is a block diagram of a cloud computing environment including the cloud computing node of FIG. 4, according to an embodiment of the invention. Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 50 can communicate with any type of computerized device over any type of network and/or network addressable connection (e.g., using a web browser).

FIG. 6 is a block diagram of functional layers of the cloud computing environment of FIG. 5, according to an embodiment of the invention. Referring now to FIG. 6, a set of functional abstraction layers provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; managing software application data 96, including those described in connection with FIGS. 1-3, above.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for software application data management, comprising:
    receiving a data stream generated via a software application;
    determining a user profile for a developer of the software application;
    predicting one or more complications in a data model of the software application; and
    managing data of the data stream received based on the one or more complications in the data model.

2. The method of claim 1, wherein determining a user profile comprises creating a new user profile or updating an existing user profile for a user.

3. The method of claim 1, wherein the receiving, determining, predicting, and managing are performed by components of a computer software platform.

4. The method of claim 3, wherein the computer software platform is a standalone platform or integrated into a software development and version control platform.

5. The method of claim 1, wherein determining the user profile comprises:
    identifying a code repository of the software application;
    connecting to the code repository as an enterprise service account;
    identifying the developer of the software application based on a most current code commit function;
    and populating the profile based on a check-in function or a commit function performed by the developer.

6. The method of claim 1, wherein the user profile comprises data for one or more profile categories comprising:
    a blame category, a dependency category, a data model complexity category, a related standards category, and an inter-dependent map category.

7. The method of claim 1, wherein determining a user profile comprises: determining currency and adoption metrics for the software application.

8. The method of claim 1, wherein predicting one or more complications in a data model of the software application comprises:
    identifying interdependent conditions in the data model of the software application based on one or more software application interdependencies, loops, fan-ins, fan-outs, or a combination thereof.

9. The method of claim 1, wherein managing data of the data stream received based on the one or more complications in the data model, comprises:
    lowering a cost metric for the software application based on a measure of conformance or increasing the cost metric based on a measure of non-conformance;
    pushing all or part of the data stream to a separate processing queue;
    moving processing of the data stream to on-demand from one or more downstream queries;
    alerting one or more users about results of the predicting;
    offloading processing to low-quality hardware or utilizing one or more additional processor cores and memory;
    recommending changes to the developer to improve processing;
    alerting a user to currency and spread of data;
    alerting a user to co-dependencies and inter-relationships requiring refactoring; or
    a combination of two or more of the above.

10. A computer program product for software application data management, comprising one or more computer readable storage media, and program instructions collectively stored on the one or more computer readable storage media for execution by one or more processors to perform a method, the program instructions comprising instructions for:
    receiving, by the one or more processors, a data stream generated via a software application;
    determining, by the one or more processors, a user profile for a developer of the software application;
    predicting, by the one or more processors, one or more complications in a data model of the software application; and
    managing, by the one or more processors, data of the data stream received based on the one or more complications in the data model.

11. The computer program product of claim 10, wherein determining a user profile comprises creating, by the one more processors, a new user profile or updating an existing user profile for a user.

12. The computer program product of claim 10, wherein the receiving, determining, predicting, and managing are performed by components of a computer software platform.

13. The computer program product of claim 12, wherein the computer software platform is a standalone platform or integrated into a software development and version control platform.

14. The computer program product of claim 10, wherein determining the user profile comprises:
    identifying, by the one more processors, a code repository of the software application;

connecting, by the one more processors, to the code repository as an enterprise service account;
identifying, by the one more processors, the developer of the software application based on a most current code commit function;
and populating, by the one more processors, the profile based on a check-in function or a commit function performed by the developer.

15. The computer program product of claim 10, wherein the user profile comprises data for one or more profile categories comprising:
a blame category, a dependency category, a data model complexity category, a related standards category, and an inter-dependent map category.

16. The computer program product of claim 10, wherein determining a user profile comprises: determining, by the one more processors, currency and adoption metrics for the software application.

17. The computer program product of claim 10, wherein predicting one or more complications in a data model of the software application comprises:
identifying, by the one more processors, interdependent conditions in the data model of the software application based on one or more software application interdependencies, loops, fan-ins, fan-outs, or a combination thereof.

18. The computer program product of claim 10, wherein managing data of the data stream received based on the one or more complications in the data model, comprises:
lowering, by the one more processors, a cost metric for the software application based on a measure of conformance or increasing the cost metric based on a measure of non-conformance;
pushing, by the one more processors, all or part of the data stream to a separate processing queue;
moving, by the one more processors, processing of the data stream to on-demand from one or more downstream queries;
alerting, by the one more processors, one or more users about results of the predicting;
offloading, by the one more processors, processing to low-quality hardware or utilizing one or more additional processor cores and memory;
recommending, by the one more processors, changes to the developer to improve processing;
alerting, by the one more processors, a user to currency and spread of data;
alerting, by the one more processors, a user to co-dependencies and inter-relationships requiring refactoring; or
a combination of two or more of the above.

19. A computer system for software application data management in a distributed computing environment, comprising:
one or more processors and one or more programming instructions stored on one or more tangible storage media of the computer system, the programming instructions being executable by the one or more processors to perform a method, the programming instructions comprising instructions for:
receiving a data stream generated via a software application;
determining a user profile for a developer of the software application;
predicting one or more complications in a data model of the software application; and
managing data of the data stream received based on the one or more complications in the data model.

20. The computer system of claim 19, wherein determining a user profile comprises creating a new user profile or updating an existing user profile for a user.

* * * * *